United States Patent [19]

Giglia et al.

[11] 4,392,721
[45] Jul. 12, 1983

[54] ELECTROCHROMIC CELL HAVING A MIXED SOLID ION-CONDUCTING LAYER

[75] Inventors: Robert D. Giglia, Rye, N.Y.; Gottfried Haacke, New Canaan, Conn.

[73] Assignee: American Cyanamid Company, Stamford, Conn.

[21] Appl. No.: 235,871

[22] Filed: Feb. 19, 1981

[51] Int. Cl.$^3$ .............................................. G02F 1/17
[52] U.S. Cl. ................................................... 350/357
[58] Field of Search ........................................ 350/357

[56] References Cited

U.S. PATENT DOCUMENTS 4,294,520 10/1981 Inoue et al. .......................... 350/357

Primary Examiner—James W. Davie
Attorney, Agent, or Firm—Gordon L. Hart

[57] ABSTRACT

An electrochromic device comprises a layer of electrochromic tungsten oxide in contact with an ion-conductive insulating layer of codeposited mixture of SiO and $Cr_2O_3$ between electrodes of reversible polarity for alternately coloring and erasing the electrochromic layer by alternate application of current in opposite directions. The mixture of components in the ion-conductive layer improves cycling life of the device.

3 Claims, No Drawings

ELECTROCHROMIC CELL HAVING A MIXED SOLID ION-CONDUCTING LAYER

The invention is an improvement in electrochromic devices having an electrochromic layer, such as a tungstic oxide film, in combination with a layer of inorganic ion-conductive insulating material.

An article by Inoue et al. which appeared in Japan Journal of Applied Physics, Vol. 16 (1977) No. 11, pages 2065–66, described electrochromic devices having the laminar structure glass/$In_2O_2$/$WO_3$/$Cr_2O_3$/Au.

and a corresponding structure using SiO instead of $Cr_2O_3$ as an ion-conductive insulating layer. In devices of this kind the tungstic oxide film has the electrochromic property of changing its light absorption and transmission characteristics upon the passing of electric current through the two layers between the electrodes. The thin film of $Cr_2O_3$ or SiO acts as an ion-conductive insulating layer. Inoue et al. observed a faint coloration in the $Cr_2O_3$ film as the tungstic oxide layer was colored, but the coloration was erased by passing reverse current and the cycles were repeatable.

On long-term cycling of such devices we have found that the coloration in the $Cr_2O_3$ layer does not erase entirely and a permanent residual coloration in the $Cr_2O_3$ layer becomes noticeable as the number of cycles is increased. Cycling life of the devices that were made with a film of SiO is typically quite limited, usually in a range about 2,000 cycles. Failure is attributed to a secondary reaction during coloration which results in the evolution of hydrogen gas at the $WO_3$ electrode. The gas evolved has been observed to blister the SiO and gold layers thereby causing short circuits which cause the areas affected to stop operating.

However, when a codeposited film containing both SiO and $Cr_2O_3$ is used as the ion-conductive insulator layer in a device of the kind described, the practical cycle life of the device is extended beyond the practical cycle life of devices that are made with a film of SiO used alone, or with a film made of $Cr_2O_3$ above. While not entirely understood, the benefit of the addition of a small amount of $Cr_2O_3$ to the SiO structure is believed to be derived from the fact that $Cr_2O_3$ is more hygroscopic than SiO. The mixture increases the water content of the insulating layer thereby resulting in an electronically insulating layer with improved protonic conduction. The improved protonic conduction reduces the operating voltage of the device and thereby reduces the magnitude of the side reactions.

The invention is an improvement in electrochromic devices comprising a layer of inorganic material having the electrochromic property and having one of its surfaces in ion-conductive contact with a surface of a single ion-conductive insulating layer which contains a mixture of SiO and $Cr_2O_3$. Those two layers are disposed between two electrode surfaces with means for passing electric current in reversible directions through the two films between the two electrodes for alternate coloration and erasing of the electrochromic layer. The novel feature of this invention is the use of both SiO and $Cr_2O_3$ as codeposited mixed components of a single ion-conductive layer in the device.

The electrochromic material used in the device is usually tungstic oxide but may also be any of the other inorganic compounds of transition metals that have the electrochromic property. A number of such inorganic electrochromic compounds have been described. Devices embodying the invention may be made for any of a variety of uses such as electrochromic windows, lenses or mirrors in which the light transmission characteristics are modified by an electrochromic layer; or electrochromic display devices in which colored images such as a figure or a display of numbers or letters can be formed and erased in response to the application of electric current. One display device of the latter kind is a digital display face for an electronic time piece such as a wristwatch. Electrochromic numeric or alpha-numeric displays can be used in electronic calculators and the like.

The electrodes and the substrate on which the functional layers are supported may be any of various suitable materials. NESA glass, having a conductive tin oxide layer is on a glass sheet or convenient support and electrode combination which is often used to provide the supporting substrate and electrode on which an electrochromic layer is applied. As a counter electrode, any metallic or other electron-conductive material may be used. Coated gold or other metals are usually preferred. A conductive layer of carbon paper can be used.

The invention will be described in more detail by reference to a specific example embodying the invention.

EXAMPLE 1

As the supporting substrate we use a small sheet of glass having one surface covered by a conductive coated film of indium oxide, as obtained from Optical Coating Laboratory. A film of electrochromic tungstic oxide, 100 m$\mu$ thick, is coated by thermal deposition in vacuum over the indium oxide film surface. Next a mixed film of mixed SiO and $Cr_2O_3$ is deposited by simultaneous thermal deposition in vacuum.

The SiO and $Cr_2O_3$ are evaporated separately but are codeposited as a single mixed film of both components. The SiO and $Cr_2O_3$ are simultaneously evaporated and deposited at relative rates and for a time that would separately deposit 160 m$\mu$ SiO and 12 m$\mu$ of $Cr_2O_3$, respectively. Finally, over the codeposited layer there is deposited by vacuum deposition an electrode layer of gold 12 m$\mu$ thick. Terminal wires are connected to the indium oxide and gold electrodes and direct current pulses of opposite polarity are applied in turn to alternately color and erase the electrochromic layer of tungstic oxide. On each half cycle about 15 millicoulombs per square centimeter are passed. The device was continuously cycled in this mode at 20° C. in air having 50% relative humidity. Under these conditions the device passed 10,000 switching cycles with no sign of degradation in any of the layers. Another device which had been constructed the same except with 5 m$\mu$ of $Cr_2O_3$ and 160 m$\mu$ of SiO codeposited in the single ion-conductive layer, withstood the same test for better than 10,000 switching cycles. Another device constructed the same except omitting $Cr_2O_3$ in the ion-conductive layer, was found to fail before it had reached 2,000 switching cycles in the same test. A device made the same except with only $Cr_2O_3$ in the ion conductive layer on cyclic testing will gradually build up a residual coloration in the $Cr_2O_3$ layer which becomes quite noticeble after only one thousand switching cycles.

The combination of SiO and $Cr_2O_3$ in a single codeposited layer as the ion conductive layer in an electrochromic device, provides advantages that are not obtained when either of those components is used separately for making such layer. Either component used alone has a relatively short useful cycling life while the combination provides a useful cycling life beyond ten thousand cycles.

We prefer to make a codeposited layer containing about 160 m$\mu$ of codeposited SiO for most devices. The amount of SiO may range from about 80 to about 250 m$\mu$. As the codeposited layer is made thinner it becomes more susceptible to short circuiting and as it is made thicker it requires higher voltage for effective operation of the device. A most preferred ratio of the two components in the codeposited film is about 160 m$\mu$ of SiO with from 2.5 to 5 m$\mu$ of $Cr_2O_3$ in the codeposited layer. Higher proportions of $Cr_2O_3$ may be used, up to about 50 m$\mu$ at which the inherent light absorption by the $Cr_2O_3$ becomes noticeable. When this effect is not important, the codeposited layer may contain as much as 160 m$\mu$ or $Cr_2O_3$, with 80 to 250 m$\mu$ of SiO.

In the foregoing description and in the claims the relative amounts of the several compounds of the single ion conductive layer are expressed in units of thickness. This is done because the measuring devices used for vacuum deposition of each component are calibrated for measuring the amount of each component used in units of thickness of the layer to be deposited.

We claim:

1. An electrochromic device comprising a layer of inorganic electrochromic material having one of its surfaces in ion-conductive contact with a surface of a single ion-conductive insulating layer which consists essentially of a codeposited mixture of SiO and $Cr_2O_3$, with those two layers disposed between two electrode surfaces with means for passing electric current in reversible directions through the two layers for alternate coloration and erasing of the electrochromic layer wherein the ratio of $Cr_2O_3$ to SiO in said codeposited mixture is the equivalent of a ratio in the range from 2.5 to 50 m$\mu$ film thickness of $Cr_2O_3$ to 160 m$\mu$ film thickness of SiO.

2. A electrochromic device defined by claim 1 werein the electrochromic material is electrochromic tungsten oxide.

3. A device defined by claim 1 wherein the amount of SiO in the layer is equivalent to about 160 m$\mu$ film thickness of SiO and the amount of $Cr_2O_3$ in the same layer is equivalent to about 2.5 to 5 m$\mu$ film thickness of $Cr_2O_3$.

* * * * *